(12) United States Patent
Xue

(10) Patent No.: US 11,379,005 B2
(45) Date of Patent: Jul. 5, 2022

(54) ROTATING SHAFT BODY AND ELECTRONIC DEVICE

(71) Applicant: VIVO MOBILE COMMUNICATION CO., LTD., Guangdong (CN)

(72) Inventor: Fei Xue, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/098,265

(22) Filed: Nov. 13, 2020

(65) Prior Publication Data

US 2021/0064089 A1 Mar. 4, 2021

Related U.S. Application Data

(63) Continuation of application No. PCT/CN2019/085988, filed on May 8, 2019.

(30) Foreign Application Priority Data

May 16, 2018 (CN) .......................... 201810468830.5

(51) Int. Cl.
*G06F 1/16* (2006.01)
*H04M 1/02* (2006.01)

(52) U.S. Cl.
CPC .......... *G06F 1/1641* (2013.01); *G06F 1/1681* (2013.01); *G06F 1/1683* (2013.01); *H04M 1/0216* (2013.01)

(58) Field of Classification Search
CPC .... G06F 1/1641; G06F 1/1652; G06F 1/1681; G06F 1/1683; H04M 1/0216
See application file for complete search history.

(56) References Cited

U.S. PATENT DOCUMENTS 4,387,760 A * 6/1983 Greschbach .............. E05D 1/04
160/199
9,173,288 B1 * 10/2015 Kim ...................... G06F 1/1681
(Continued)

FOREIGN PATENT DOCUMENTS

CN 105491193 A 4/2016
CN 206790538 U 12/2017
(Continued)

OTHER PUBLICATIONS

Extended European Search Report dated Jun. 10, 2021 as received in Application No. 19803721.0.

(Continued)

*Primary Examiner* — Nidhi Thaker
(74) *Attorney, Agent, or Firm* — Maschoff Brennan

(57) ABSTRACT

A rotating shaft body and an electronic device are provided. The rotating shaft body includes a first rotating surface and a second rotating surface. The first rotating surface and the second rotating surface have a common side edge. The axis of rotation of the first rotating surface and the axis of rotation of the second rotating surface are on a same side and do not overlap. The first rotating surface is provided with a first stopper part. The second rotating surface is provided with a second stopper part. The rotating shaft body further includes a supporting surface. The supporting surface is provided on a same side as the axes of rotation of the two rotating surfaces. The supporting surface is concave toward the two rotating surfaces. Two sides of the supporting surface are provided with a third stopper part and a fourth stopper part respectively.

13 Claims, 10 Drawing Sheets

(56) References Cited

U.S. PATENT DOCUMENTS

| | | | |
|---|---|---|---|
| 9,348,450 B1* | 5/2016 | Kim | G06F 1/1616 |
| 9,535,452 B2* | 1/2017 | Ahn | G06F 1/1615 |
| 9,557,771 B2* | 1/2017 | Park | H04M 1/0237 |
| 10,028,395 B2* | 7/2018 | Chen | G06F 1/1626 |
| 10,469,635 B1* | 11/2019 | Carlson | G06F 1/1683 |
| 10,868,896 B2* | 12/2020 | Carlson | G06F 1/1616 |
| 11,061,445 B2* | 7/2021 | Kim | G06F 1/1652 |
| 11,194,366 B2* | 12/2021 | Cheng | G06F 1/1652 |
| 2010/0085274 A1 | 4/2010 | Kilpatrick, II et al. | |
| 2011/0063783 A1* | 3/2011 | Shim | G06F 1/1615 |
| | | | 361/679.01 |
| 2013/0021762 A1* | 1/2013 | van Dijk | H04M 1/022 |
| | | | 361/749 |
| 2014/0126121 A1* | 5/2014 | Griffin | H04M 1/0216 |
| | | | 361/679.01 |
| 2014/0173851 A1 | 6/2014 | Gong | |
| 2018/0059740 A1 | 3/2018 | Kato | |
| 2021/0011513 A1* | 1/2021 | Watamura | G06F 1/1652 |
| 2021/0064089 A1 | 3/2021 | Xue | |

FOREIGN PATENT DOCUMENTS

| | | | | |
|---|---|---|---|---|
| CN | 107621853 A | 1/2018 | | |
| CN | 108667967 A | 10/2018 | | |
| DE | 29 35 967 A1 | 4/1981 | | |
| DE | 2935967 A1 * | 4/1981 | | E05D 1/04 |
| EP | 0 014 361 A1 | 8/1980 | | |
| JP | 62145948 | 11/1977 | | |
| JP | 65129580 A | 10/1980 | | |
| JP | 2012502373 A | 1/2012 | | |
| KR | 20160027625 A | 3/2016 | | |
| WO | 2013/076710 A2 | 5/2013 | | |
| WO | 2013/080191 A2 | 6/2013 | | |

OTHER PUBLICATIONS

Written Opinion and International Search Report in Application No. PCT/CN2019/085988 dated Nov. 26, 2020.

KR Office Action dated Sep. 3, 2021 as received in Application No. 10-2020-7034575.

IN Office Action dated Sep. 24, 2021 as received in Application No. 202027054322.

Japanese Office Action dated Jan. 11, 2022 as received in application No. 2020-564162.

* cited by examiner

US 11,379,005 B2

ROTATING SHAFT BODY AND ELECTRONIC DEVICE

CROSS-REFERENCE TO RELATED APPLICATION

The present application is a continuation application of PCT Application No. PCT/CN2019/085988 filed on May 8, 2019, which claims a priority to Chinese Patent Application No. 201810468830.5 filed in China on May 16, 2018, a disclosure of which is incorporated in its entirety by reference herein.

TECHNICAL FIELD

The present disclosure relates to the field of rotating shaft technology, and in particular to a rotating shaft body and an electronic device.

BACKGROUND

Currently, an electronic device such as a mobile phone and a tablet computer usually has a single-screen design. The single-screen design provides portability, but inconvenience in reading results from its limited size. Electronic devices with foldable screens emerge as people demand for both larger screen and portability. The folding or unfolding of a foldable screen of an electronic device in the related art is usually implemented by using a conventional circular rotating shaft. For a circular rotating shaft, the surface of the circular rotating shaft is a smooth rotating surface. Therefore, when the foldable screen rotates around the circular rotating shaft, the position of the foldable screen cannot be set without using another position-setting component. As a result, a rotating angle of the foldable screen cannot be adequately controlled.

It may be seen that, the circular rotating shaft in the related art suffers from a problem that the rotating angle of a rotating component cannot be adequately controlled because the position of the rotating component cannot be set.

SUMMARY

In a first aspect, an embodiment of the present disclosure provides a rotating shaft body, including a first rotating surface and a second rotating surface, where the first rotating surface and the second rotating surface have a common side edge, an axis of rotation of the first rotating surface and an axis of rotation of the second rotating surface are on a same side and do not overlap, the first rotating surface is provided with a first stopper part, and the second rotating surface is provided with a second stopper part;

the rotating shaft body further includes a supporting surface, the supporting surface is provided on a same side as the axes of rotation of the two rotating surfaces, the supporting surface is concave toward the two rotating surfaces, and two sides of the supporting surface are provided with a third stopper part and a fourth stopper part respectively.

In a second aspect, an embodiment of the present disclosure provides an electronic device, including a first housing and a second housing, where each of the first housing and the second housing is provided with a display screen, the first housing and the second housing are connected by the rotating shaft body described in the first aspect, the first housing is rotatable around a first rotating surface of the rotating shaft body, and the second housing is rotatable around a second rotating surface of the rotating shaft body.

BRIEF DESCRIPTION OF THE DRAWINGS

To describe the technical solutions of the embodiments of the present disclosure more clearly, the following briefly describes the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative efforts.

DETAILED DESCRIPTION

The following describes clearly the technical solutions according to the embodiments of the present disclosure with reference to the accompanying drawings in the embodiments of the present disclosure. It is apparent the embodiments in the following description are merely a part rather than all of the embodiments of the present disclosure. All other embodiments obtained by a person of ordinary skill in the art based on the embodiments of the present disclosure without creative efforts shall fall within the scope of the present disclosure.

Figure 1:
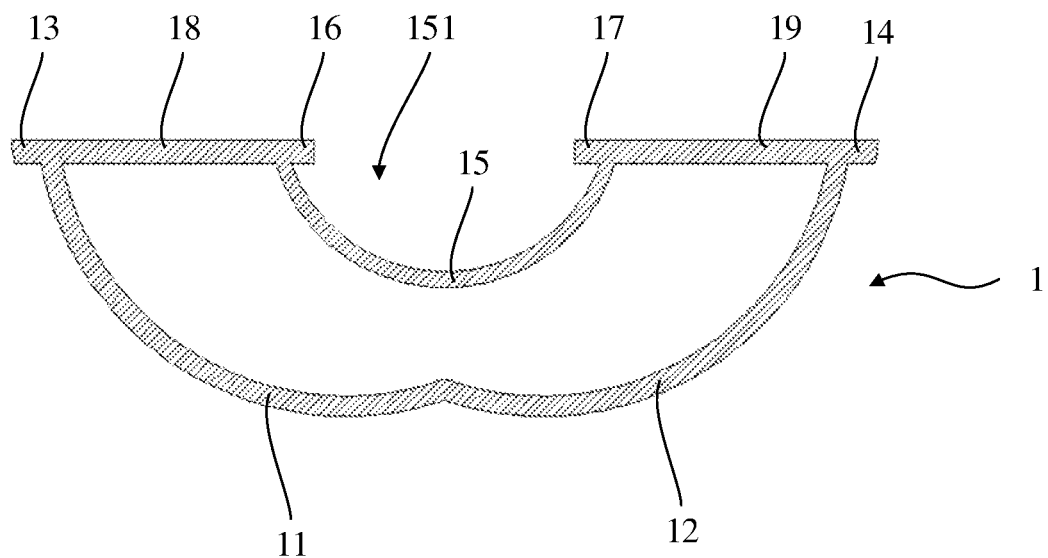
FIG. 1 is a sectional view of a rotating shaft body according to an embodiment of the present disclosure.
Figure 2:
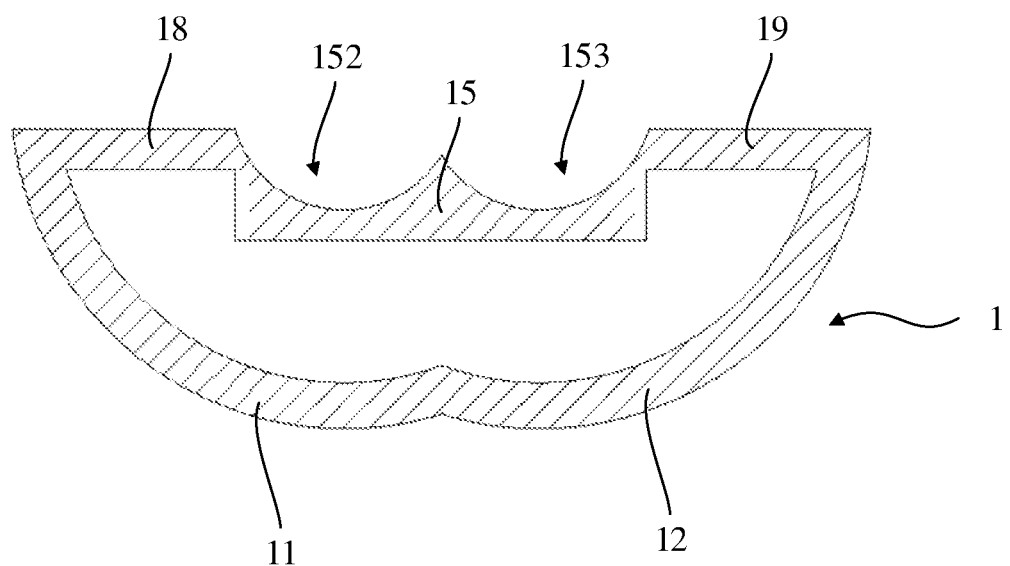
FIG. 2 is another sectional view of a rotating shaft body according to an embodiment of the present disclosure.
Figure 3:
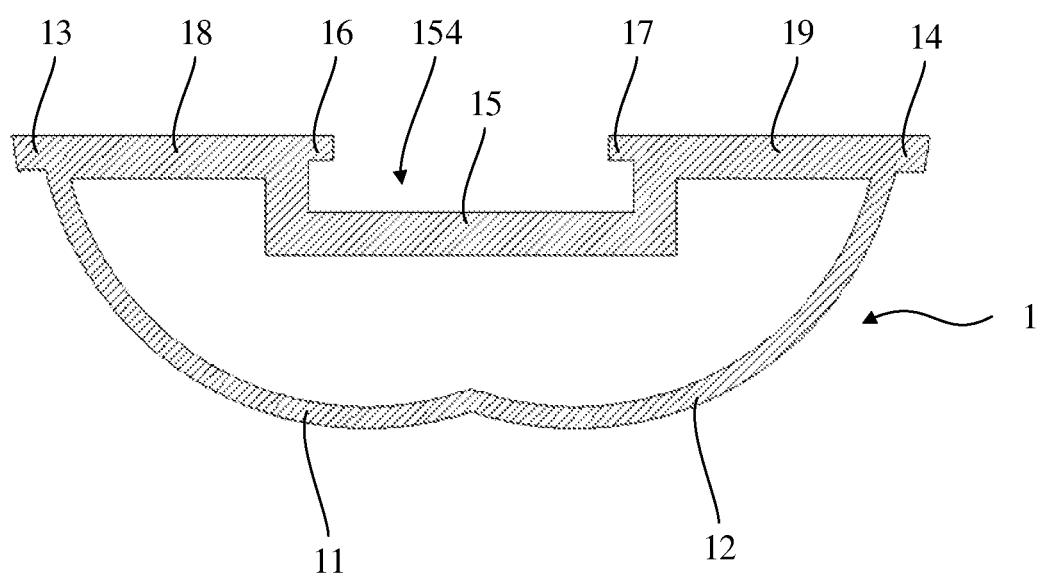
FIG. 3 is still another sectional view of a rotating shaft body according to an embodiment of the present disclosure.
Figure 4:
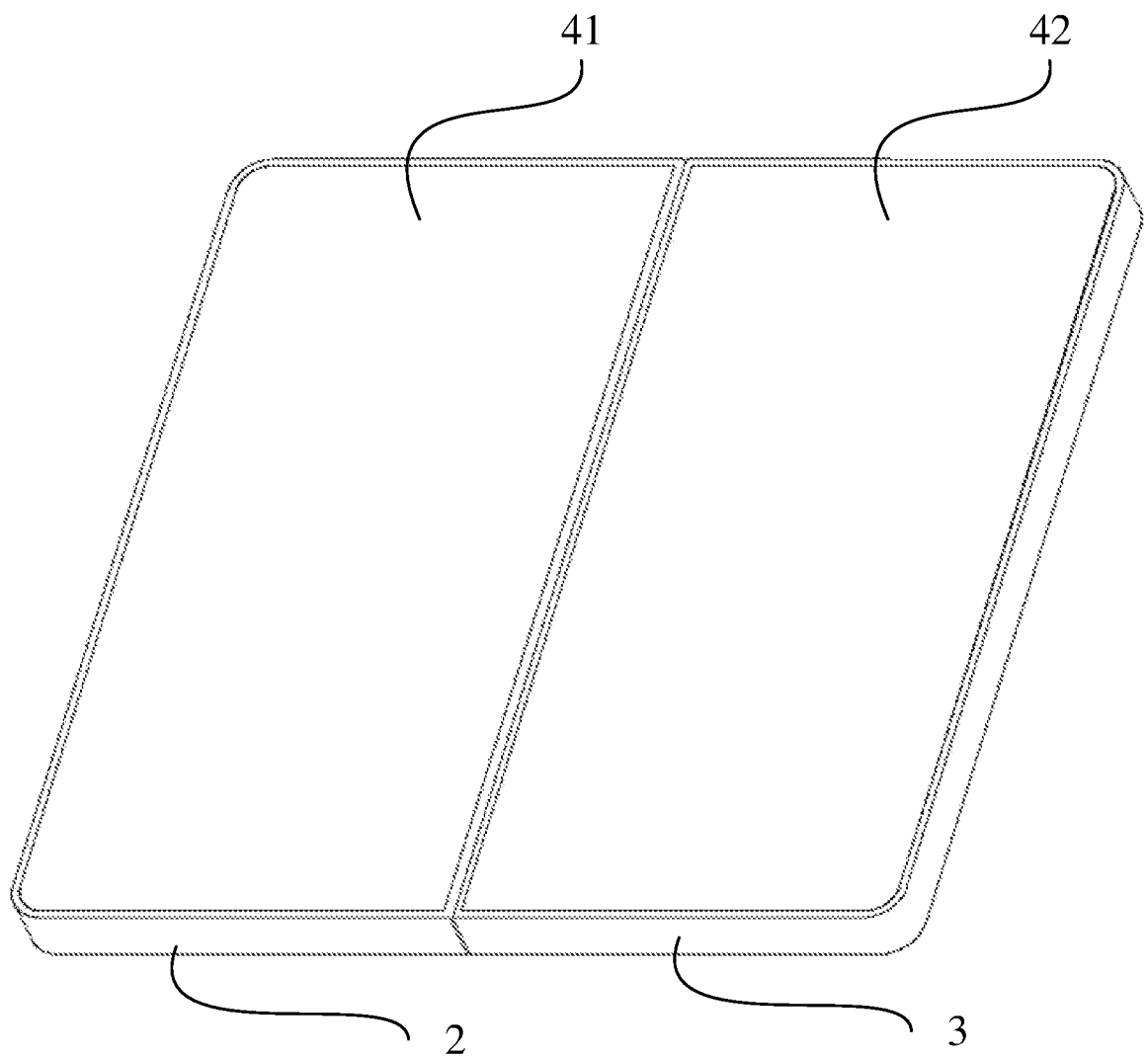
FIG. 4 is a schematic structural diagram of an electronic device, completely unfolded, according to an embodiment of the present disclosure.

As shown in FIG. 1 to FIG. 3, the present disclosure provides in some embodiments a rotating shaft body 1. The rotating shaft body 1 includes a first rotating surface 11 and a second rotating surface 12. The first rotating surface 11 and the second rotating surface 12 have a common side edge. The axis of rotation of the first rotating surface 11 and the axis of rotation of the second rotating surface 12 are on a same side and do not overlap. The first rotating surface 11 is provided with a first stopper part 13. The second rotating surface 12 is provided with a second stopper part 14.

The rotating shaft body 1 further includes a supporting surface 15. The supporting surface 15 is provided on a same side as the axes of rotation of the two rotating surfaces. The supporting surface 15 is concave toward the two rotating surfaces. Two sides of the supporting surface 15 are provided with a third stopper part 16 and a fourth stopper part 17 respectively.

The rotating shaft body in the embodiments of the present disclosure may be used to connect two rotating components. The first rotating surface 11 and the second rotating surface 12 may provide the two rotating components with mutually independent rotating surfaces. For example, a first rotating component is rotatable around the first rotating surface 11, and a second rotating component is rotatable around the second rotating surface 12. A space formed by the concave supporting surface 15 not only provides a space for accommodating the support legs of the two rotating components, but also may provide a space allowing for the rotation of the support legs of the two rotating components.

It needs to be noted that, the support leg of the rotating component may be understood as a portion of the rotating component that is configured to support the rotating component when the rotating component rotates around the rotating shaft body 1. For the related description of the support leg of the rotating component, a specific description is provided below with reference to an "electronic device".

The first stopper part 13 and the second stopper part 14 are not only used to prevent the two rotating components from falling off from respective rotating surfaces, but also used to limit maximum rotating angles of the two rotating components along the respective rotating surfaces. The first stopper part 13, the second stopper part 14, the third stopper part 16, and the fourth stopper part 17 are jointly used to prevent the two rotating components from falling off from the rotating shaft body 1. The first stopper part 13 and the third stopper part 16 are jointly used to form a position-setting plane. The second stopper part 14 and the fourth stopper part 17 are jointly used to form a position-setting plane. The two position-setting planes may be used to implement the position-setting of the two rotating components respectively and may also be used to support the two rotating components respectively. Specifically, when the two rotating components rotate along the mutually independent rotating surfaces, the rotating components stop rotating when the rotating components rotate to the positions of the respective position-setting planes.

In the embodiments of the present disclosure, the axial length of the rotating shaft body 1 is not limited. The rotating shaft body 1 may be one long rotating shaft body 1. There may be one, two or more stopper parts on the rotating shaft body 1. Optionally, the rotating shaft body 1 may be multiple short segments of rotating shaft bodies 1, and there is one stopper part on each segment of rotating shaft body.

In the embodiments of the present disclosure, to provide a smooth and unhindered rotating trajectory, the first rotating surface 11 and the second rotating surface 12 may both be arc-shaped surfaces that bend toward a same side. A maximum rotating path of each rotating surface is an arc length of the rotating surface. The first rotating surface 11 and the second rotating surface 12 may be symmetrically disposed or may be asymmetrically disposed.

In the embodiments of the present disclosure, the rotating shaft body is a special-shaped rotating shaft different from those in the related art. The rotating shaft in the related art is usually a circular rotating shaft. The surface of the circular rotating shaft is an integral and smooth rotating surface. The two rotating components are both rotatable around a common rotating surface. In contrast, the rotating shaft body in the embodiments of the present disclosure has two independent rotating surfaces. The two rotating components may rotate along the mutually independent rotating surfaces respectively. In addition, because the surface of the circular rotating shaft is an integral and smooth rotating surface, the positions of rotating components cannot be set by the circular rotating shaft, and the rotating angles of the rotating components cannot be adequately controlled. For the rotating shaft body according to the embodiments of the present disclosure, because stopper parts are disposed on the two rotating surfaces and the supporting surface respectively, the positions of two rotating components may be set by the respective corresponding stopper parts, so that the rotating angles of the rotating components can be adequately controlled.

In addition, in the embodiments of the present disclosure, because the two rotating surfaces are independent of each other, the rotating surfaces may be lengthened in the direction of the width of the rotating shaft body, so that not only a relatively long rotating path can be obtained, but also the size of the rotating shaft body in the thickness direction does not become excessively large.

In the embodiments of the present disclosure, the first stopper part 13 and the third stopper part 16 may be disposed in a mutually disconnected manner, and the second stopper part 14 and the fourth stopper part 17 may be disposed in a mutually disconnected manner. The rotating surfaces and the supporting surface 15 may be connected by a connecting portion to form the rotating shaft body 1. The first stopper part 13 and the third stopper part 16 may be disposed in a mutually disconnected manner and the third stopper part 16 and the fourth stopper part 17 may be disposed in a mutually connected manner, or the first stopper part 13 and the third stopper part 16 may be disposed in a mutually connected manner, and the third stopper part 16 and the fourth stopper part 17 may be disposed in a mutually disconnected manner, to form the rotating shaft body 1.

Optionally, the first stopper part 13 is connected to the third stopper part 16, to form a first stopping surface 18 connecting the first rotating surface 11 and the supporting surface 15, and the second stopper part 14 is connected to the fourth stopper part 17, to form a second stopping surface 19 connecting the supporting surface 15 and the second rotating surface 12.

In this way, with the foregoing arrangement, on one hand, the surface of the rotating shaft body 1 according to the embodiments of the present disclosure is a continuous surface, which helps to improve the overall strength of the rotating shaft body 1; on the other hand, the first stopping surface 18 and the second stopping surface 19 may further be used to support the two rotating components when positions of the two rotating components are set.

Optionally, the first stopping surface 18 is a plane, and the second stopping surface 19 is a plane. In this way, the structure and the manufacturing of the rotating shaft body 1 are simpler. In addition, the first stopping surface 18 and the second stopping surface 19 are planes, and can fit with the two rotating components respectively when positions of the two rotating components are set, to increase the contact area between the stopping surface and the rotating component, thereby improving the position-setting effect and supporting effect.

Optionally, the first stopping surface 18 and the second stopping surface 19 are located in a same plane. In this way, when the positions of the two rotating components are set, the surfaces of the two rotating components can be located in a same plane, which is especially applicable to an object for which a flat surface needs to be formed, such as a dual-screen mobile phone.

Optionally, the rotating shaft body 1 is an axially symmetric rotating shaft body, so as to achieve a better rotating effect.

The embodiments of the present disclosure may be applied to an object that requires a rotating shaft connection, such as a toy, a utensil, an instrument or an electronic device. An electronic device is used as an example. Currently, an electronic device such as a mobile phone, a tablet computer, a notebook computer, an electronic reader usually requires a rotating shaft to enable opening and closing or rotation, which is especially true for a foldable-screen phone that requires a rotating shaft to enable the folding or unfolding of a screen. Therefore, in the embodiments of the present disclosure, an example in which the rotating shaft body is applied to an electronic device is used for specific description.

As shown in FIG. 4 to FIG. 12, the present disclosure provides in some embodiments an electronic device, including a first housing 2 and a second housing 3. The first housing 2 and/or the second housing 3 is provided with a display screen 4. The first housing 2 and the second housing 3 are connected by a rotating shaft body 1. The first housing 2 is rotatable around a first rotating surface 11 of the rotating shaft body 1. The second housing 3 is rotatable around a second rotating surface 12 of the rotating shaft body 1.

Both the first housing 2 and the second housing 3 need to be provided, at a portion through which the rotating shaft body 1 is connected, with a cavity 5 matching the shape of the rotating shaft body 1.

In the embodiments of the present disclosure, the first housing 2 and the second housing 3 may be connected by one long rotating shaft body or may be connected by multiple short segments of rotating shaft bodies spaced apart.

In the embodiments of the present disclosure, the first housing 2 or the second housing 3 may be provided with the display screen 4, for example, in an electronic device such as a notebook computer or a single-screen phone. Or, both the first housing 2 and the second housing 3 may be provided with display screens 4. That is, the first housing 2 is provided with a first display screen 41, and the second housing 3 is provided with a second display screen 42.

Figure 12:
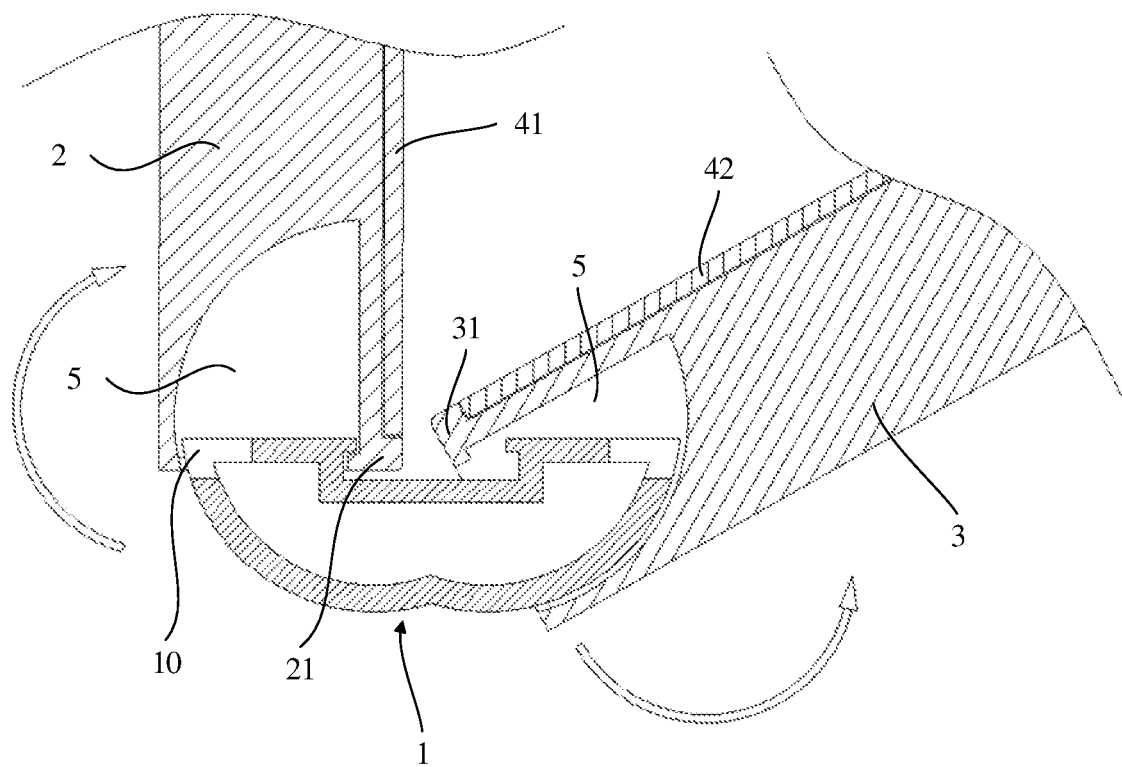
FIG. 12 is a second sectional view of an electronic device using the rotating shaft body as shown in FIG. 3 according to an embodiment of the present disclosure.

There may be circuit control or data transmission between two housings of an electronic device. For example, a circuit connection needs to be disposed between a display screen and a processor of a notebook computer, between a display screen and a circuit board of a flip cover phone or between two display screens of a dual-screen phone. Therefore, based on the foregoing consideration, the electronic device may further include wiring (not shown in the figure). The rotating shaft body 1 may be provided with a wire-through hole 10 (as shown in FIG. 12). The wire-through hole 10 is used for the wiring to pass through. The wiring extends from an interior of the first housing 2 to an interior of the second housing 3 through the wire-through hole 10 in the rotating shaft body 1.

For the rotating shaft body 1 provided with a first stopping surface 18 and a second stopping surface 19, the wire-through hole 10 may be provided to penetrate from the first stopping surface 18 to the second stopping surface 19.

Optionally, the rotating shaft body 1 is a hollow rotating shaft body. The rotating shaft body 1 is formed by the first rotating surface 11, the second rotating surface 12, the second stopping surface 19, the supporting surface 15, and the first stopping surface 18 which are sequentially connected in an enclosing manner.

In this way, with the foregoing arrangement, on one hand, the rotating shaft body 1 according to the embodiments of the present disclosure has a light weight, which facilitates the lightweight design of the rotating shaft body 1, on the other hand, for an implementation in which the wire-through hole 10 needs to be opened on the rotating shaft body 1, the wire-through hole 10 only needs to be opened on the first stopping surface 18 and the second stopping surface 19, so that it is simpler and more convenient to provide the wire-through hole 10.

In addition, when the rotating shaft body 1 according to the embodiments of the present disclosure is a hollow rotating shaft body, compared with a hollow circular rotating shaft with the same thickness, a space inside the rotating shaft body 1 according to the embodiments of the present disclosure is larger than that inside the circular rotating shaft, so that a wiring space of the rotating shaft body 1 is expanded.

Optionally, a first battery (not shown in the figure) is provided in the first housing 2, and a second battery (not shown in the figure) is provided in the second housing 3. The first battery and the second battery are electrically connected by the wiring.

In this way, by providing a battery in each of the first housing 2 and the second housing 3, the battery capacity of the electronic device can be increased.

Optionally, the first housing 2 is provided with the first display screen 41, the second housing 3 is provided with the second display screen 42, and the first display screen 41 is electrically connected to the second display screen 42 by the wiring.

In this way, with the foregoing dual-screen arrangement, the display area of the display screen 4 can be increased.

Figure 5:
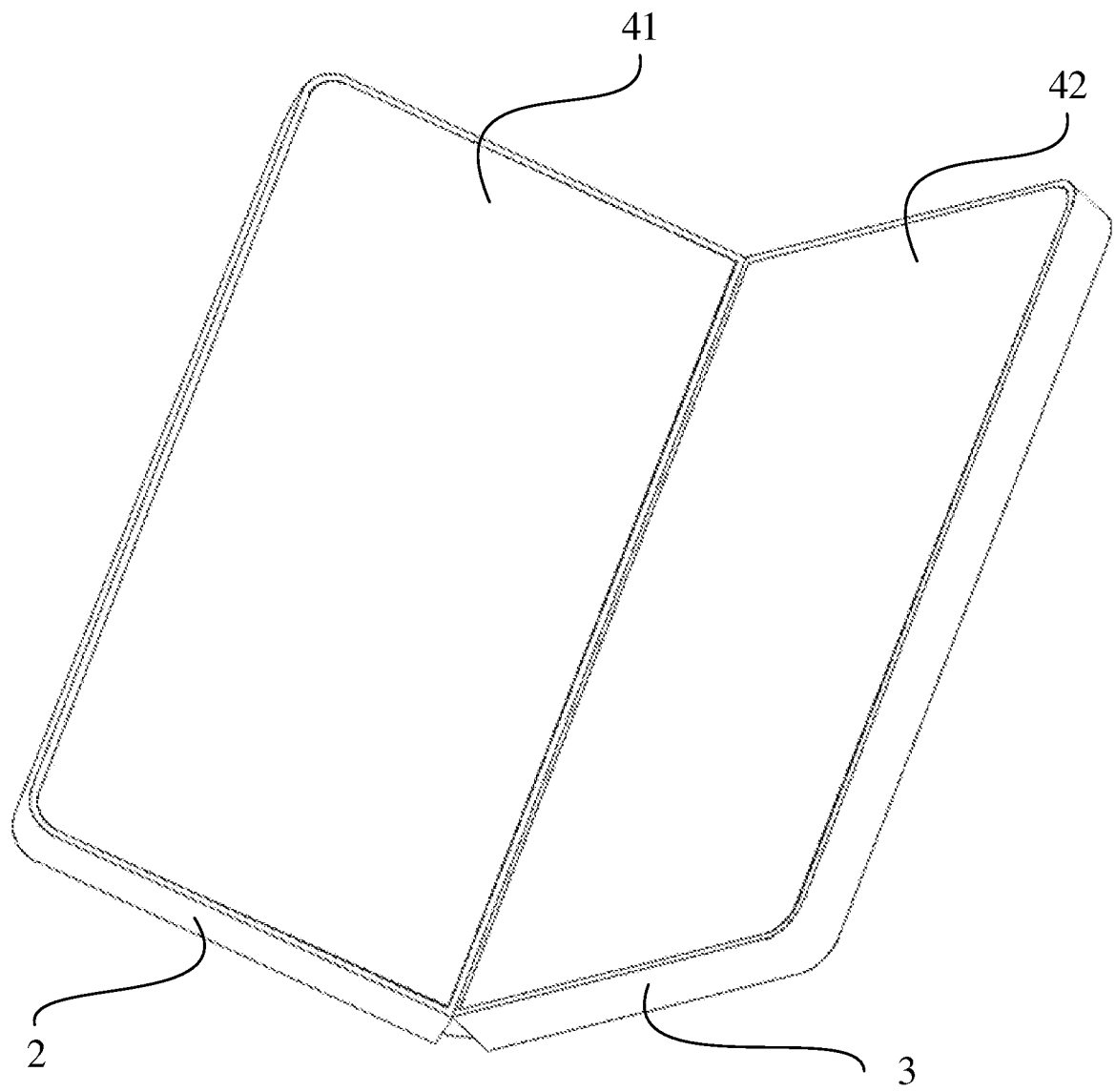
FIG. 5 is a schematic structural diagram 1 of an electronic device, half unfolded, according to an embodiment of the present disclosure.
Figure 6:
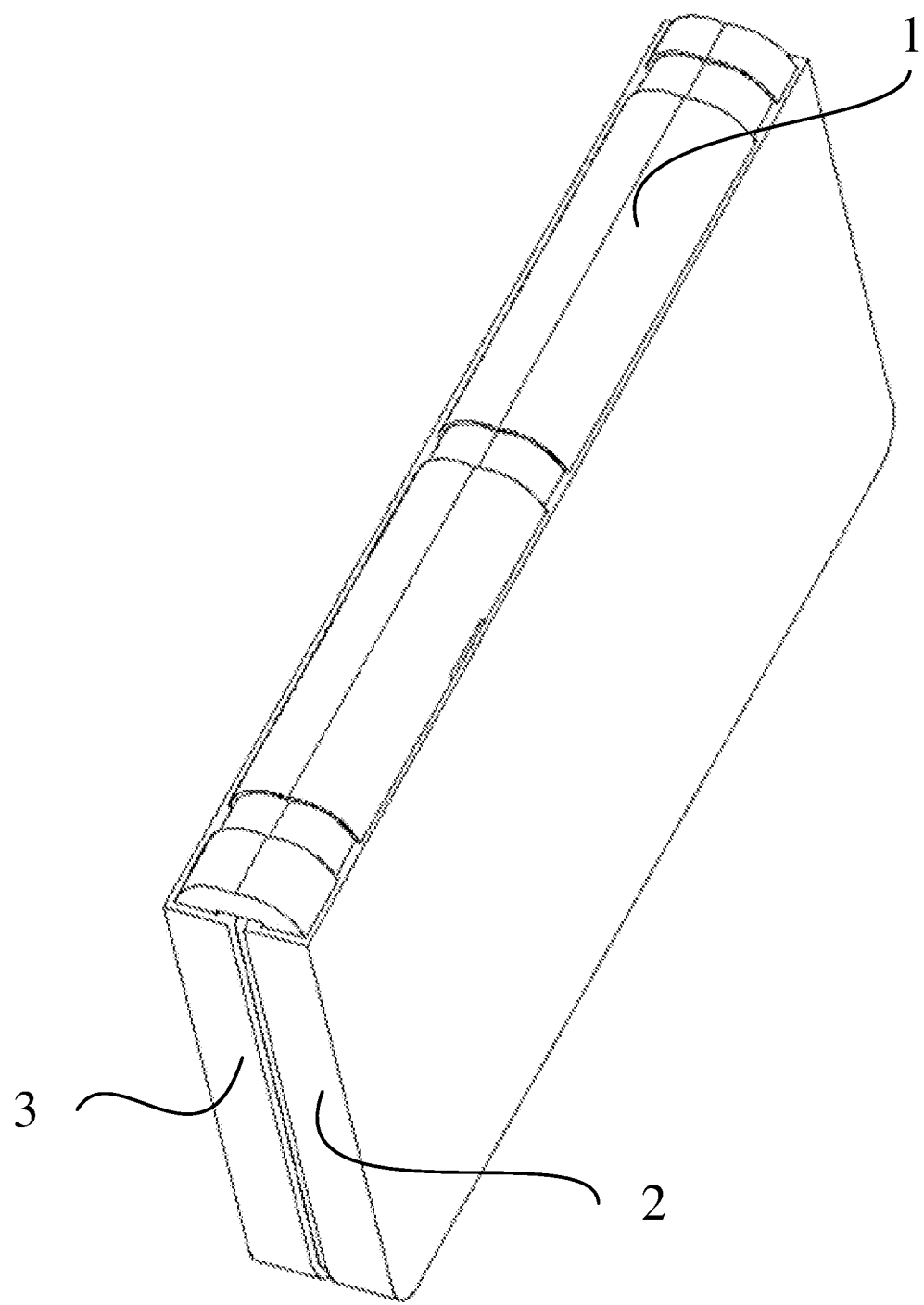
FIG. 6 is a schematic structural diagram of an electronic device, folded, according to an embodiment of the present disclosure.
Figure 7:
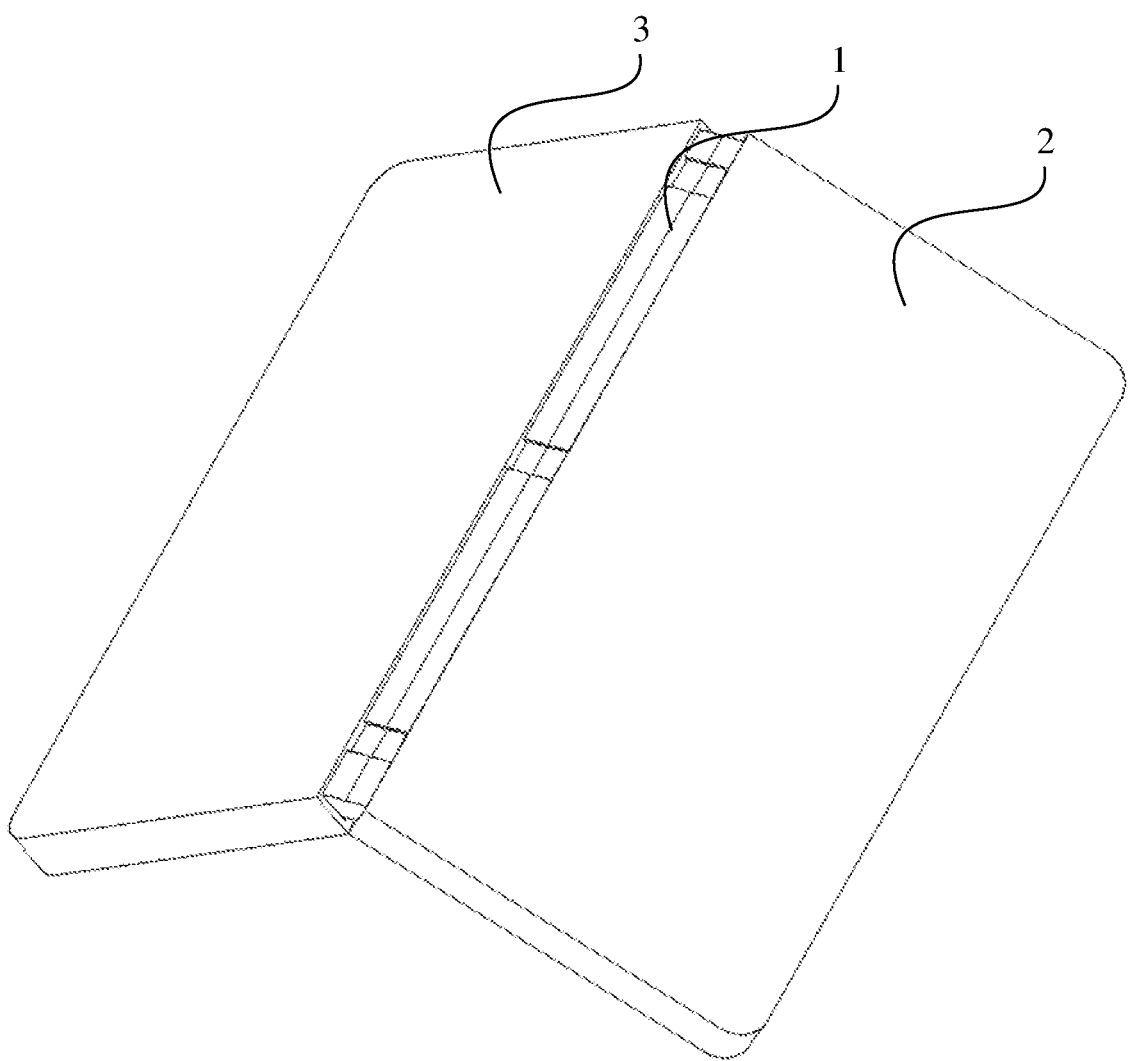
FIG. 7 is a second schematic structural diagram of an electronic device, half unfolded, according to an embodiment of the present disclosure.
Figure 8:
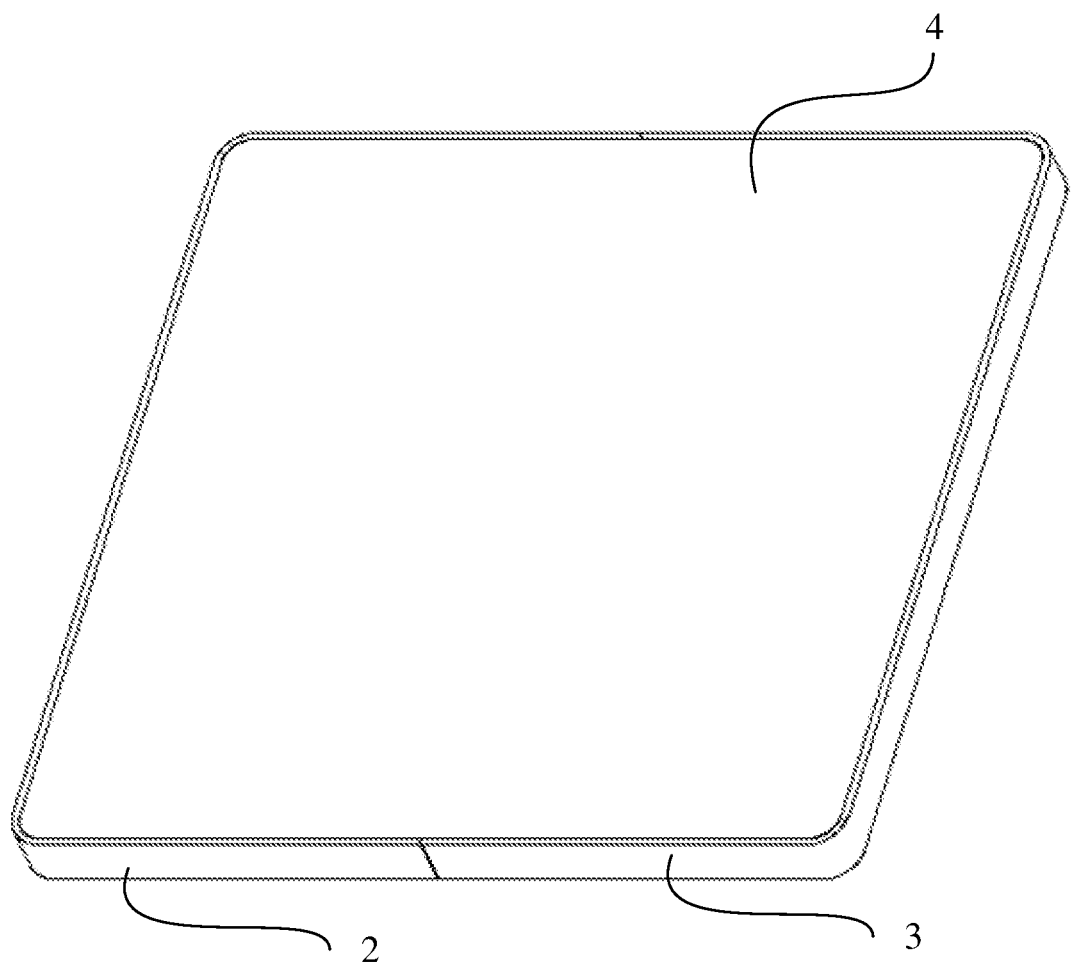
FIG. 8 is a schematic structural diagram of a flexible-screen electronic device, completely unfolded, according to an embodiment of the present disclosure.
Figure 9:
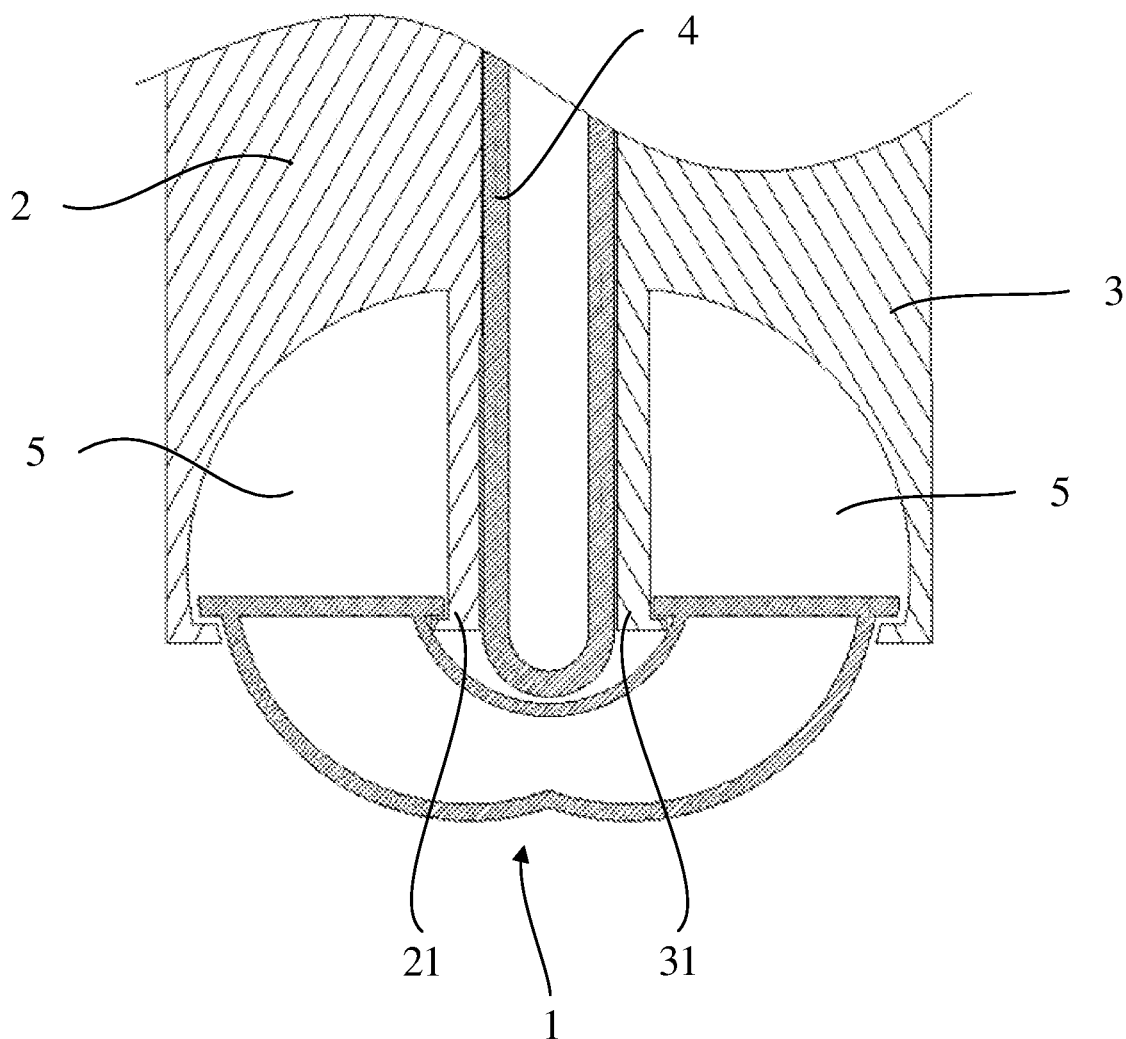
FIG. 9 is a sectional view of a flexible-screen electronic device using the rotating shaft body as shown in FIG. 1 according to an embodiment of the present disclosure.
Figure 10:
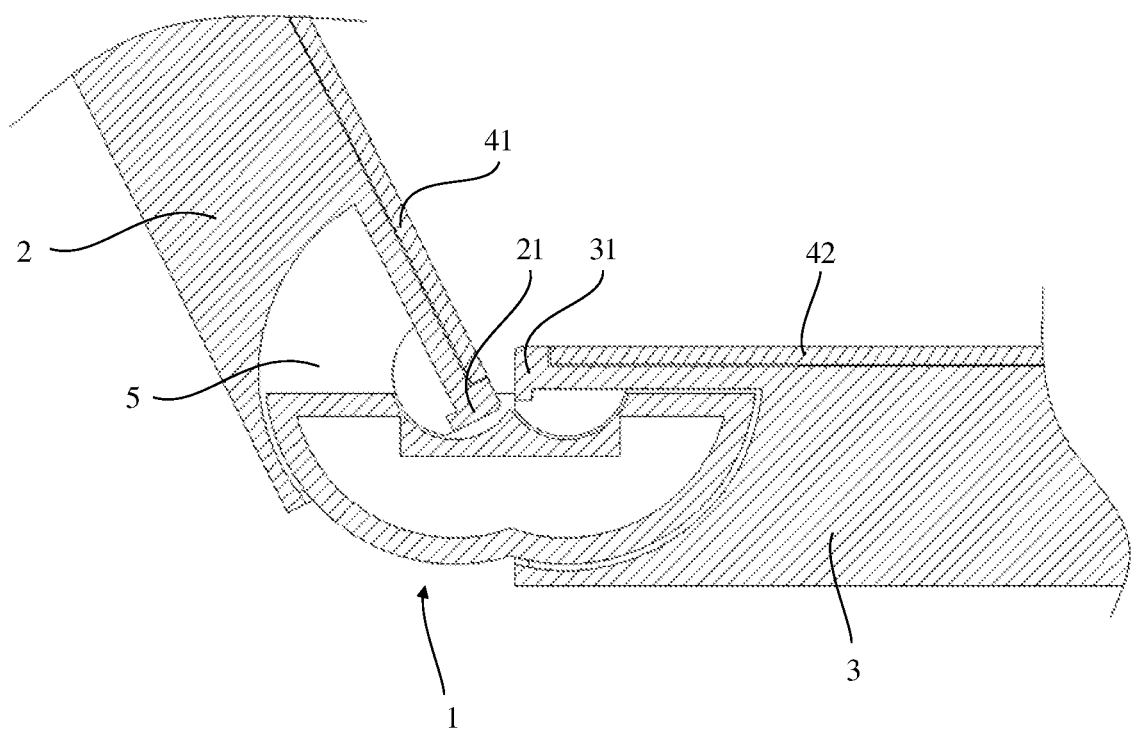
FIG. 10 is a sectional view of an electronic device using the rotating shaft body as shown in FIG. 2 according to an embodiment of the present disclosure.
Figure 11:
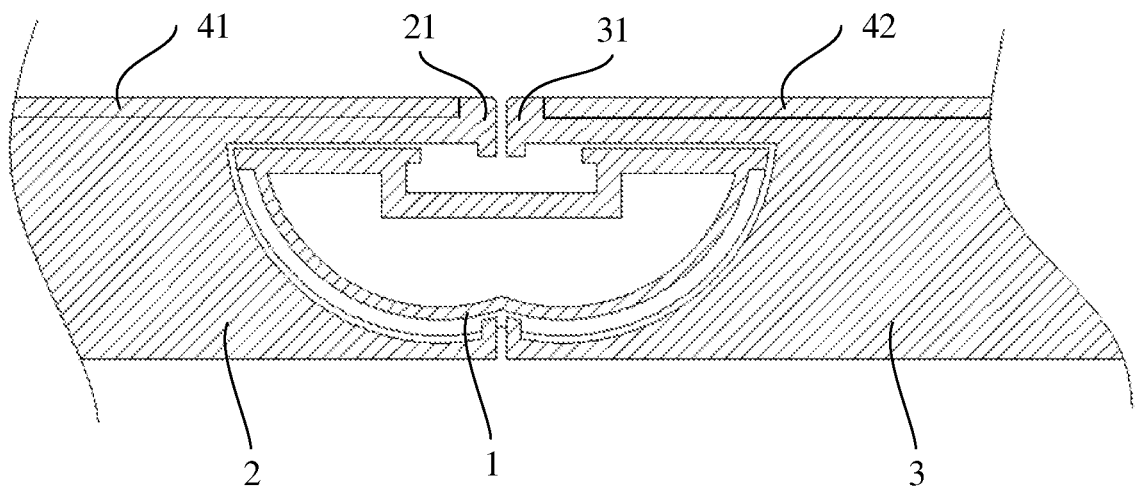
FIG. 11 is a first sectional view of an electronic device using the rotating shaft body as shown in FIG. 3 according to an embodiment of the present disclosure.

It needs to be noted that for an electronic device, a wire-through hole does not necessarily need to be provided in the rotating shaft body 1. For example, as shown in FIG. 5, when the display screen 4 of the electronic device is an integral flexible screen disposed on the first housing 2 and the second housing 3, assuming that a circuit board is disposed in the first housing 2, and other than the flexible screen, the second housing 3 is provided with no component that requires circuitry control or data transmission, then in this case, the entire display screen 4 may be controlled by the circuit board disposed in the first housing 2. No wiring needs to be disposed between the first housing 2 and the second housing 3, and a wire-through hole does not need to be provided in the rotating shaft body 1.

Optionally, the display screens 4 are disposed on sides of the first housing 2 and/or the second housing 3 close to the supporting surface 15 of the rotating shaft body 1.

In this way, when the first housing 2 and the second housing 3 are folded together, the display screen 4 can be received between the two housings, to protect the display screen 4.

Optionally, as shown in FIG. 1, the supporting surface 15 is concave to form a first arc-shaped groove 151.

When the display screen 4 of the electronic device is a flexible screen, the implementation may be used. Because the supporting surface 15 is concave to form the first arc-shaped groove 151, when the flexible display screen 4 is folded, the flexible display screen 4 may adequately bend according to the arc of the first arc-shaped groove 151, so that the flexible display screen 4 won't be crushed by the supporting surface 15 and damaged.

Optionally, as shown in FIG. 2, the supporting surface 15 is concave to form a second arc-shaped groove 152 and a third arc-shaped groove 153. The second arc-shaped groove 152 allows for the rotation of a support leg 21 of a first rotating component (that is, the first housing 2 of the electronic device) of two rotating components. The third arc-shaped groove 153 allows for the rotation of a support leg 31 of a second rotating component (that is, the second housing 3 of the electronic device) of the two rotating components.

In this way, because of the guiding effect of the second arc-shaped groove 152 and the third arc-shaped groove 153, the support leg 21 of the first housing 2 may smoothly rotate along the arc surface of the second arc-shaped groove 152, and the support leg 31 of the second housing 3 may smoothly rotate along the arc surface of the third arc-shaped groove 153. Therefore, the rotation performance of the rotating shaft body 1 can be improved.

Optionally, as shown in FIG. 3, the supporting surface 15 is concave to form a rectangular groove 154.

It needs to be noted that, in the embodiments of the present disclosure, by adjusting the sizes of various portions of the rotating shaft body 1, the first housing 2, and the second housing 3, when the first housing 2 and the second housing 3 are unfolded, a gap between the first display screen 41 and the second display screen 42 can be limited to a range of relatively small values (for example, less than or equal to 0.3 mm). When the first housing 2 and the second housing 3 are folded together, the gap between the first display screen 41 and the second display screen 42 can be limited to a range of relatively small values (for example, less than or equal to 1.6 mm).

In the embodiments of the present disclosure, the electronic device may be any device having a display screen, for example, a computer, a mobile phone, a tablet computer, a laptop computer, a personal digital assistant (PDA), a mobile Internet device (MID), a wearable device, an electronic reader, a navigator, a digital camera or the like.

The aforementioned are merely specific implementations of the present disclosure, but the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A rotating shaft body, comprising a first rotating surface and a second rotating surface, wherein the first rotating surface and the second rotating surface have a common side edge, an axis of rotation of the first rotating surface and an axis of rotation of the second rotating surface are on a same side and do not overlap, the first rotating surface is provided with a first stopper part, and the second rotating surface is provided with a second stopper part;

the rotating shaft body further comprises a supporting surface, the supporting surface is provided on a same side as the axes of rotation of the two rotating surfaces, the supporting surface is concave toward the two rotating surfaces, and two sides of the supporting surface are provided with a third stopper part and a fourth stopper part respectively;

wherein the first stopper part and the third stopper part are connected, to form a first stopping surface connecting the first rotating surface and the supporting surface;

the second stopper part and the fourth stopper part are connected, to form a second stopping surface connecting the supporting surface and the second rotating surface;

wherein the first stopping surface and the second stopping surface are located in a same plane.

2. The rotating shaft body according to claim 1, wherein the rotating shaft body is a hollow rotating shaft body, and the rotating shaft body is formed by the first rotating surface, the second rotating surface, the second stopping surface, the supporting surface, and the first stopping surface which are sequentially connected in an enclosing manner.

3. The rotating shaft body according to claim 2, wherein the rotating shaft body is provided with a wire-through hole.

4. The rotating shaft body according to claim 1, wherein the supporting surface is concave to form a first arc-shaped groove; or, the supporting surface is concave to form a second arc-shaped groove and a third arc-shaped groove; or, the supporting surface is concave to form a rectangular groove.

5. The rotating shaft body according to claim 4, wherein the rotating shaft body is provided with a wire-through hole.

6. The rotating shaft body according to claim 1, wherein the rotating shaft body is provided with a wire-through hole.

7. The rotating shaft body according to claim 1, wherein the rotating shaft body is provided with a wire-through hole.

8. An electronic device, comprising a first housing and a second housing, wherein the first housing and/or the second housing is provided with a display screen, the first housing and the second housing are connected by a rotating shaft body the first housing is rotatable around a first rotating surface of the rotating shaft body, and the second housing is rotatable around a second rotating surface of the rotating shaft body; wherein the rotating shaft body comprises the first rotating surface and the second rotating surface, wherein the first rotating surface and the second rotating surface have a common side edge, an axis of rotation of the first rotating surface and an axis of rotation of the second rotating surface are on a same side and do not overlap, the first rotating surface is provided with a first stopper part, and the second rotating surface is provided with a second stopper part; the rotating shaft body further comprises a supporting surface, the supporting surface is provided on a same side as the axes of rotation of the two rotating surfaces, the supporting surface is concave toward the two rotating surfaces, and two sides of the supporting surface are provided with a third stopper part and a fourth stopper part respectively, wherein the first stopper part and the third stopper part are connected, to form a first stopping surface connecting the first rotating surface and the supporting surface; the second stopper part and the fourth stopper part are connected, to form a second stopping surface connecting the supporting surface and the second rotating surface.

9. The electronic device according to claim 8, wherein the display screen is disposed on sides of the first housing and/or the second housing close to the supporting surface of the rotating shaft body.

10. The electronic device according to claim 8, wherein the first housing and the second housing are connected by the rotating shaft body, the rotating shaft body is provided with a wire-through hole;

the electronic device further comprises wiring, and the wiring extends from an interior of the first housing to an interior of the second housing through the wire-through hole in the rotating shaft body.

11. The electronic device according to claim 10, wherein a first battery is provided in the first housing, a second battery is provided in the second housing, and the first battery and the second battery are electrically connected by the wiring.

12. The electronic device according to claim 10, wherein the first housing is provided with a first display screen, the second housing is provided with a second display screen, and the first display screen and the second display screen are electrically connected by the wiring.

13. The electronic device according to claim 8, wherein the rotating shaft body is a hollow rotating shaft body, and the rotating shaft body is formed by the first rotating surface, the second rotating surface, the second stopping surface, the supporting surface, and the first stopping surface which are sequentially connected in an enclosing manner.

\* \* \* \* \*